N. M. BROWN.
FEEDER FOR ENSILAGE MACHINES.
APPLICATION FILED FEB. 12, 1913.

1,093,763.

Patented Apr. 21, 1914.
2 SHEETS—SHEET 1.

Witnesses:
C. E. Wessels
T. Colson.

Inventor:
Norton M. Brown,
By Joshua R. H. Horn
his Attorney.

N. M. BROWN.
FEEDER FOR ENSILAGE MACHINES.
APPLICATION FILED FEB. 12, 1913.
1,093,763.
Patented Apr. 21, 1914.
2 SHEETS—SHEET 2.
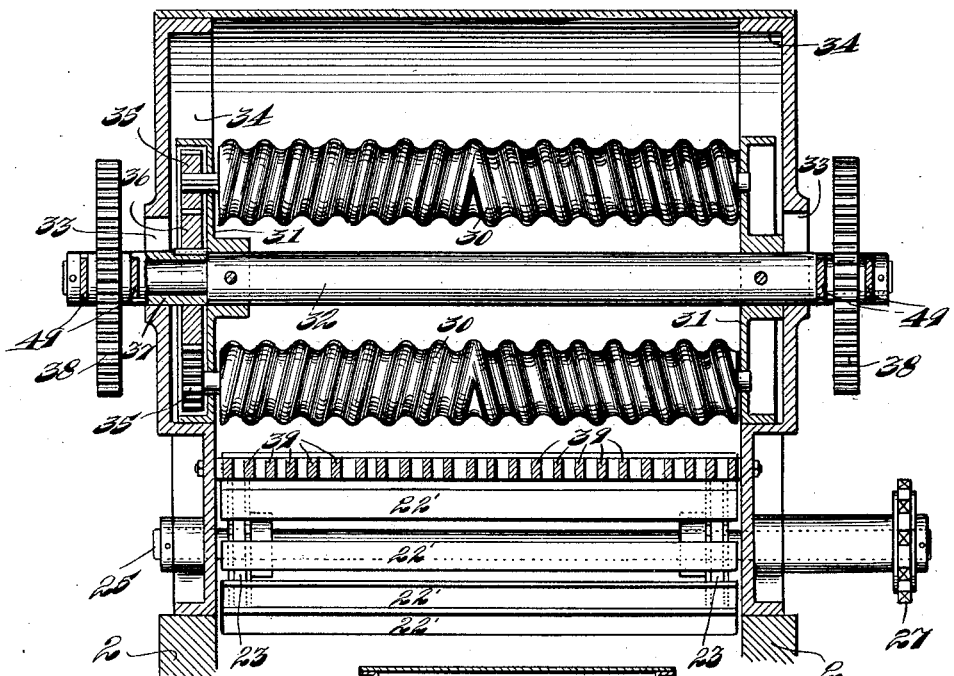
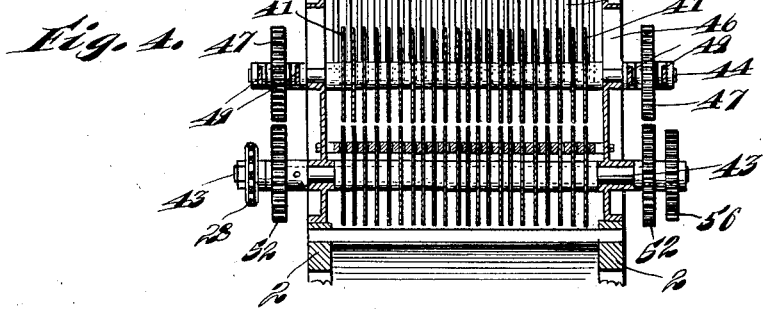

UNITED STATES PATENT OFFICE.

NORTON M. BROWN, OF AURORA, ILLINOIS.

FEEDER FOR ENSILAGE-MACHINES.

1,093,763. Specification of Letters Patent. Patented Apr. 21, 1914.

Application filed February 12, 1913. Serial No. 747,842.

*To all whom it may concern:*

Be it known that I, NORTON M. BROWN, a citizen of the United States, and a resident of the city of Aurora, county of Kane, and State of Illinois, have invented certain new and useful Improvements in Feeders for Ensilage-Machines, of which the following is a specification.

My invention relates to ensilage machines and more particularly to feeding mechanism for such machines in which the material is automatically spread and fed into the cutting part of such machines.

The object of my invention is the production of a machine of the character mentioned which will be of durable and economical construction and efficient in operation.

Other objects will appear hereinafter.

The invention consists in the combinations and arrangements of parts hereinafter described and claimed.

Figure 1:
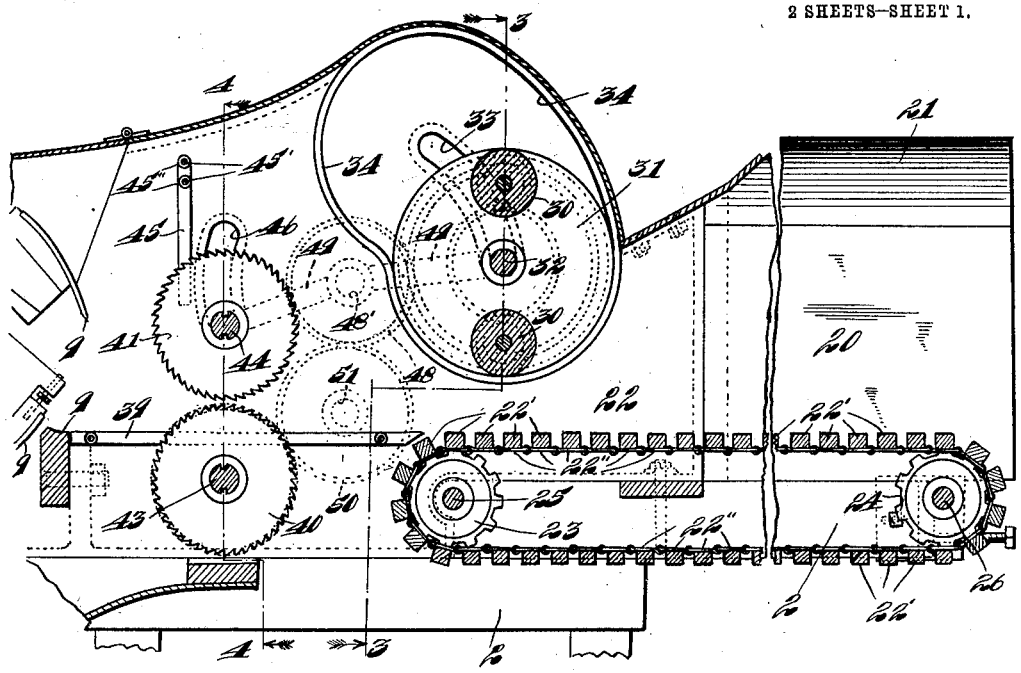
Figure 2:
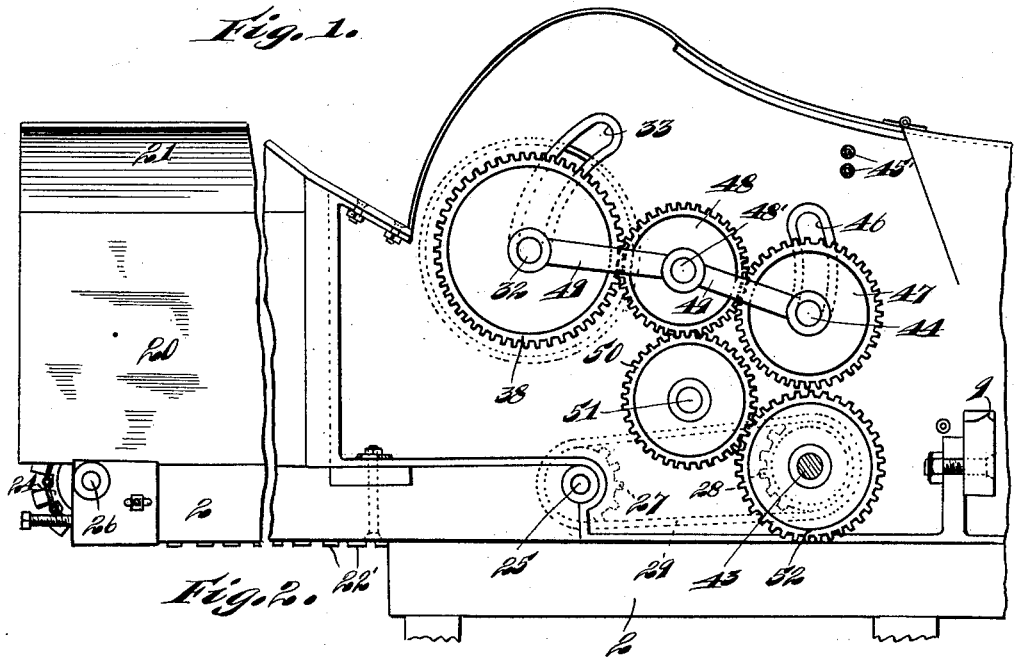

The invention will be best understood by reference to the accompanying drawings forming a part of this specification, and in which, Figure 1 is a longitudinal section of the feeder of an ensilage machine embodying my invention, Fig. 2 is a side elevation of the same, Fig. 3 is an enlarged section taken on line 3—3 in Fig. 1, and Fig. 4 is a section taken on line 4—4 in Fig. 1, but on a smaller scale.

The preferred form of construction, as illustrated in the accompanying drawings comprises a trough having sides 20 which are mounted upon horizontal extensions of the supporting frame 2, as clearly shown in Figs. 1 and 2. The upper side of the trough 20 is open and provided with flaring edges 21 on sides 20 to facilitate directly the bundles of material which are to be fed by the device in the formation of the ensilage. The bottom of the trough is formed by an endless traveling belt 22 which consists of spaced transverse slats 22' which are secured at their ends to endless chains or flexible elements 22''. The belt 22 travels around rollers 23 and 24 which are mounted upon shafts 25 and 26 arranged at the respective ends of the trough.

Arranged at the inner bight of the conveyer belt 22 over the shaft 25 is a pair of revoluble rollers 30 the respective ends of which are rotatably mounted in disks 31 which are fixed to a shaft 32. Said shaft 32 is mounted for free movement in arcuate slots 33 provided in the sides 20 so as to permit of a floating movement of the rollers 30, the disks 31, in the movement of shaft 32, moving in correspondingly formed recesses 34 provided on the inner sides 20 of the trough, see Figs. 1 and 3. Provided at corresponding ends of the rollers 30 are pinions 35 which, upon revolution of the rollers step around a relatively stationary gear 36 causing rotation of said rollers on their axes at the same time as said rollers are revolved around the shaft 32. The arrangement is such, as will be observed, that the rollers 30 will coöperate with the inner bight of the conveying belt to insure positive feeding of the material deposited on the belt and carried inwardly thereby, toward the cutting mechanism 9. The rollers 30 by reason of the mounting thereof permitting of floating movement, will adjust themselves to the thickness of the bundle or the quantity of material positioned upon the conveyer belt and the weight of said rollers will cause the material carried by the belt to be compressed into more compact form. The periphery of each of the rollers 30 is oppositely helically grooved from its center toward its ends, as clearly shown in Fig. 3, so that in contact of said rollers with the material positioned upon the conveyer belt, the latter will be distributed outwardly upon the belt away from the center thereof and thus secure a more even and uniform distribution of the material before the same reaches the cutting mechanism.

The gear 36 is held relatively stationary by means of a sleeve 37 which is loosely mounted upon the shaft 32 and to which said gear is fixed, as shown in Fig. 3, said sleeve being held against rotation in the manner hereinafter described. Rotation of the shaft 32 is secured through gears 38 provided at its respective extremities which mesh with other gears hereinafter described.

After the material has passed between the rollers 30 and the inner bight of the conveying belt 22, the same is directed by spaced guide bars 39 to pass between superposed rollers 40 and 41 and thence to the cutter 9. Said rollers are fixed to shafts 43 and 44 respectively. Each of said rollers 40 and 41 comprises a plurality of spaced disks having toothed peripheries, the provision of teeth at the peripheries of said disks insuring effectual engagement of the latter with the material which is passed between the same. The guide bars 39 pass through the spaces between the disks which form the roller 40, as clearly shown in Figs. 1 and 4, so that in addition to said bars serving as means for guiding the material to position between the rollers 40 and 41, the same also serve as stripping means preventing any accumulation upon the periphery of said roller as might otherwise result. Coöperating with the roller 41 are stripping bars 45, the lower ends of which project into the spaces between the disks which compose said roller, the upper ends of said bars 45 being mounted on rods 45′ and spaced apart by blocks 45″, as clearly shown in Figs. 1 and 4. The extremities of the shaft 44 of the roller 41 are freely mounted in the arcual slots 46 provided in the sides 20 so as to permit of free movement of said shaft and hence floating movement of the roller in order to adapt the latter to accommodate itself to the thickness of the supply of material passing through the machine. The rotation of the shaft 44 and hence roller 41 is secured through the medium of gears 47 provided at the respective ends thereof. The gears 38, provided at the respective ends of the shaft 32, and the gears 47 mesh with gears 48, the latter being journaled on stud-shafts 48′ carried by sides 20, said gears 38 and 47 being held in engagement with the gears 48 and at the same time for free rocking movement relative to said gears, by means of links 49 which latter engage shafts 32 and 44 and stud shaft 48′. One of the links 49 which coöperates with the shaft 32 is formed integral with the outer end of sleeve 37, above described, as shown in Fig. 3, thereby serving to hold said sleeve and hence the gear 36 connected therewith against relative rotary movement. The gears 48 mesh with gears 50 and are held in engagement therewith, said gears 50 being journaled on stud shafts 51 carried by sides 20. The gears 50 mesh with gears 52 carried on the end portions of shaft 43. With the arrangement disclosed, it will be seen that, gears 38 and 47 are mounted for free arcual movement, and at the same time are constantly held in mesh with gears 48 by connecting links coöperating therewith, an operative connection being thereby established between the shafts 43 and the feed rollers 30 and 41 which permits of floating movement of the latter. One end of the shaft 43 is connected by means of a sprocket chain 29 with the shaft 25 of the conveyer belt 22, said sprocket chain passing over coplanar sprocket wheels 27 and 28 provided on said shafts, as clearly shown in Figs. 2, 3 and 4.

In the operation of the machine, bundles of corn or other material from which the ensilage is to be formed are first deposited in the trough between sides 20 upon the belt 22. In the carriage of the bundles of material inwardly, they are carried under the rollers 30 which cause the same to be spread or uniformly distributed on the belt and to pack the same more closely together. After passing from under the rollers 30, the material is guided by bars 39 between the rollers 40 and 41 whence the same is again guided by said bars to the cutting mechanism 9. In the passage of the material between the rollers 41 and 42, the same is divided and further packed or compressed so as to better condition the same for engagement by the cutting mechanism.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a machine of the class described, conveying mechanism comprising in combination an endless belt; a pair of revoluble rollers mounted to float above said belt; and means for driving said rollers and said belt, substantially as described.

2. In a machine of the class described, conveying mechanism comprising in combination an endless belt; a rotatable member mounted to float above said belt for coöperation therewith in feeding material deposited upon said belt, said member comprising rotatable end pieces; a pair of rollers extending between and having their ends secured to said end pieces so that when the latter are rotated said rollers will be revolved; and means for revolving said rollers and driving said belt, substantially as described.

3. In a machine of the class described, conveying mechanism comprising in combination an endless belt; a rotatable member mounted to float above said belt for coöperation therewith in feeding material deposited upon said belt, said member comprising rotatable end pieces; a pair of rollers extending between and having their ends secured to said end pieces so that when the latter are rotated said rollers will be revolved; means for rotating said rollers during revolution thereof, and means for revolving said rollers and for driving said belt, substantially as described.

4. In a machine of the class described, conveying mechanism comprising in combination an endless belt; a pair of superposed rollers at the discharge end of said belt; a rotary member arranged above and adapted for coöperation with said belt in feeding material deposited upon said belt, the upper one of said superposed rollers and said rotary member being mounted to float; means for driving the lower one of said superposed rollers; and an operative connection between said last mentioned roller and the other of said rollers and said rotary member permitting of free floating movement of the latter, substantially as described.

5. In a machine of the class described, conveying mechanism comprising in combination an endless belt; a pair of superposed rollers at the discharge end of said belt; a rotary member arranged above and adapted for coöperation with said belt in feeding material deposited upon said belt, the upper one of said superposed rollers and said rotary member being mounted to float; means for driving the lower one of said superposed rollers; and a gear connection between said last mentioned roller and the other of said rollers and said rotary member permitting of free rotary movement of the latter, substantially as described.

6. In a machine of the class described, conveying mechanism comprising in combination an endless belt; a pair of superposed rollers at the discharge end of said belt; a rotary member arranged above and adapted for coöperation with said belt in feeding material deposited upon said belt, the upper one of said superposed rollers and said rotary member being mounted to float; means for driving the lower one of said superposed rollers; a gear connection between said last mentioned roller and the other of said rollers and said rotary member permitting of free rotary movement of the latter, said gear connection comprising a gear carried by said lower roller; a second gear mounted in mesh with said first gear; gears carried by said upper roller and said rotary member; and an idler gear with which said last mentioned gears and said second mentioned gear mesh and about which they are adapted to rock, substantially as described.

7. In a machine of the class described, conveying mechanism comprising in combination an endless belt; a pair of superposed rollers at the discharge end of said belt; a rotary member arranged above and adapted for coöperation with said belt in feeding material deposited upon said belt, the upper one of said superposed rollers and said rotary member being mounted to float; means for driving the lower one of said superposed rollers; a gear connection between said last mentioned roller and the other of said rollers and said rotary member permitting of free rotary movement of the latter, said gear connection comprising a gear carried by said lower roller; a second gear rockingly mounted in mesh with said first gear; gears carried by said upper roller and said rotary member; and an idler gear with which said last mentioned gears and said second mentioned gear mesh and about which they are adapted to rock, substantially as described.

8. In a machine of the class described, conveying mechanism comprising, in combination, a conveying member; a pair of revoluble rollers mounted to float above said conveying member; and means for revolving said rollers and operating said conveying member, substantially as described.

In testimony whereof I have signed my name to this specification in the presence of two subscribing witnesses.

NORTON M. BROWN.

Witnesses:
A. A. OLSON,
JOSHUA R. H. POTTS.